United States Patent [19]
Burdorff

[11] Patent Number: 5,018,550
[45] Date of Patent: May 28, 1991

[54] DISHWASHER OVERFILL PROTECTION DEVICE

[75] Inventor: Mark A. Burdorff, Pine Grove Township, Van Buren County, Mich.

[73] Assignee: Whirlpool Corporation, Benton Harbor, Mich.

[21] Appl. No.: 599,990

[22] Filed: Oct. 19, 1990

[51] Int. Cl.[5] .................... H01H 35/18; F16K 21/18; F16K 31/18; F16K 33/00

[52] U.S. Cl. .................... 137/387; 73/306; 73/322.5; 134/57 D; 134/58 D; 137/412; 137/429; 200/84 R

[58] Field of Search .................... 73/322.5, 306, 309; 134/57 D, 58 D; 137/387, 412, 413, 429, 430; 68/207, 208; 200/83 WM, 84 R

[56] References Cited

U.S. PATENT DOCUMENTS

| | | | |
|---|---|---|---|
| 3,464,437 | 9/1969 | Zane | 137/387 |
| 3,643,681 | 2/1972 | Simmons | 137/429 |
| 3,721,783 | 3/1973 | Hancock | 200/84 R |
| 3,885,580 | 5/1975 | Cushing | 137/387 |
| 3,894,555 | 7/1975 | Payne | 137/429 |
| 4,178,957 | 12/1979 | Hoffman et al. | 137/387 |
| 4,180,085 | 12/1979 | Berges et al. | 137/387 |
| 4,180,095 | 12/1979 | Woolley et al. | 137/387 |
| 4,256,136 | 3/1981 | Crawford | 137/429 |
| 4,289,154 | 9/1981 | Quayle | 200/84 R |
| 4,301,829 | 11/1981 | Rowe | 134/57 D |

*Primary Examiner*—George L. Walton
*Attorney, Agent, or Firm*—Hill, Van Santen, Steadman & Simpson

[57] ABSTRACT

A dishwasher is provided with an improved apparatus for protecting the tub from being overfilled in the form of a float having a float stem that is automatically captured upon insertion through a passage in the tub bottom wall such that the float will be restrained against disengagement from the tub bottom wall. The float is vertically movable to operate a control switch for regulating the level of water within the tub. Preferably a retaining ring is carried on a stem of the float which is automatically biased through a varying diameter keyway and is subsequently moved to a captured position below the member having the keyway.

17 Claims, 2 Drawing Sheets

DISHWASHER OVERFILL PROTECTION DEVICE

BACKGROUND OF THE INVENTION

This invention relates to overfill protection devices used in dishwashers, wherein the protection device utilizes a float within the wash chamber to actuate a switch positioned outside of the wash chamber. Such overfill protection devices are known, such as that disclosed in U.S. Pat. No. 3,894,555.

Such overfill protection devices generally include a float having a body with a specific gravity of less than one for responding to the height of water within the dishwasher tub. The float is supported by a vertical wall or standpipe located on the lower wall or floor of the tub. The float has a diameter greater than that of the standpipe such that the float is supported by the standpipe. A float stem extends downwardly from the float through the standpipe and below the lower tub wall, having near its lower termination a retaining ring for preventing removal of the float from the standpipe.

With such a device, it is necessary to assemble the switch after the float and retainer since the switch lever interferes with the placement of the retainer on the float stem. This is a difficult and time consuming assembly step since the switch is located in a relatively inaccessible location. Further, attachment of the retainer to the stem after the stem has been inserted through the tub wall is somewhat difficult due to the relatively inaccessible location of the retaining ring.

SUMMARY OF THE INVENTION

The present invention provides an improved float/switch assembly which permits the retainer to be attached to the float stem prior to inserting the stem through the tub wall. The present invention also permits the retainer to be automatically captured by a housing for the switch which can be assembled to the dishwasher prior to the attachment of the float.

The improved overflow apparatus comprises a passage, such as a standpipe extending through the bottom wall of the dishwasher tub, the passage including an open top and bottom end. A float is positioned in the passage including a float body for responding to water level within the tub and a stem, secured to the float body, and having a bottom end termination below the tub bottom wall operatively engageable with switch means for controlling a means for introducing water into the tub. Restraining means are located beneath the tub bottom wall for restraining upward movement of the float. Further, means are associated with the restraining means and the float for causing automatic captured engagement of the stem with the restraining means upon a sufficient downward movement of the stem relative to the restraining means and preventing disengagement of the stem from the restraining means upon a predetermined amount of relative upward movement of the stem.

In a preferred embodiment, located beneath the standpipe is a housing containing a float switch responsive to the float for preventing overfill of the dishwasher tub. A keyway having a widened portion for permitting passage therethrough of a retaining ring carried on the float stem and a narrowed portion for restricting passage of the retaining ring therethrough is located within the housing. The housing has a wall extending from the main body of the housing, with an actuating arm of the switch extending from the housing to a position underneath the keyway.

The housing is oriented relative to the standpipe such that the narrowed portion of the keyway is aligned coaxially with the central axis of the standpipe.

A pair of upstanding walls extends above the switch housing arm, the upstanding walls located on each side of the narrowed portion of the keyway. The upstanding walls are separated a distance less than a diameter of the retaining ring, each of which includes a relieved or angled guiding edge which biases the retaining ring toward the widened portion of the keyway when the float stem is inserted into the standpipe. The float stem is sufficiently flexible so that the retaining ring remains in position on the float stem when the retaining ring remains in or is deflected or biased by the upstanding walls.

When inserted, the float stem portion having the retaining ring is received through the widened portion of the keyway, whereupon the float stem returns to a straightened configuration projecting through the narrowed portion of the keyway. The retainer ring secures the float stem below the housing arm, preventing unintentional removal of the float from the dishwasher.

DESCRIPTION OF THE PREFERRED EMBODIMENTS

Figure 1:
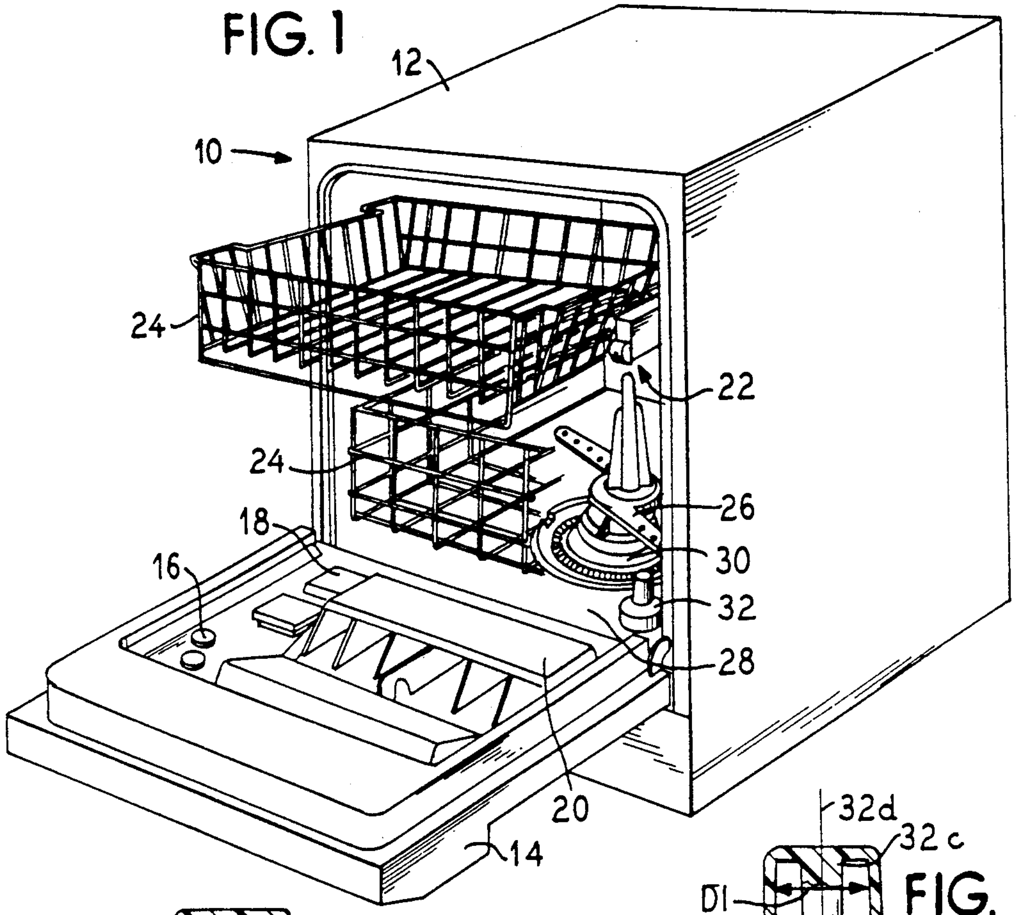
FIG. 1 is a perspective view of an automatic dishwasher in which the overflow protection device of the present invention finds utility.
Figure 3:
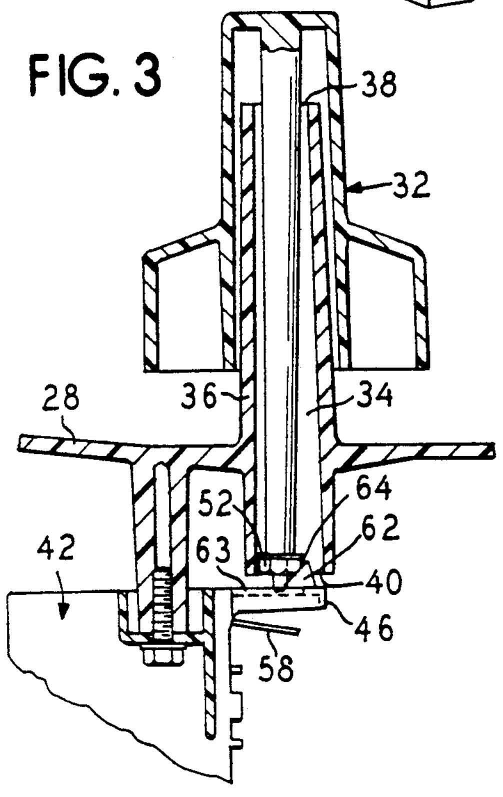
FIG. 3 is a side sectional view of the float stem being inserted further through the standpipe than the position of FIG. 2.
Figure 2:
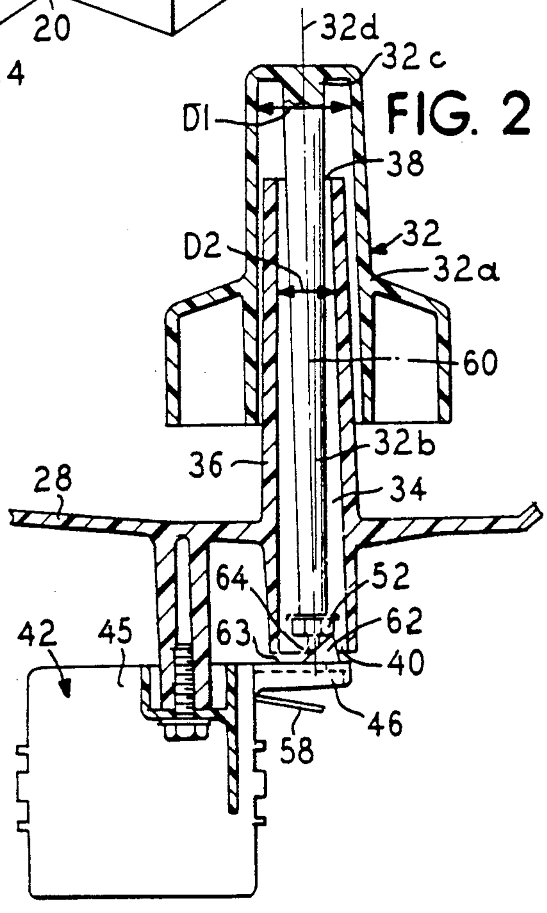
FIG. 2 is a side sectional view of the float stem being inserted through the standpipe.
Figure 5:
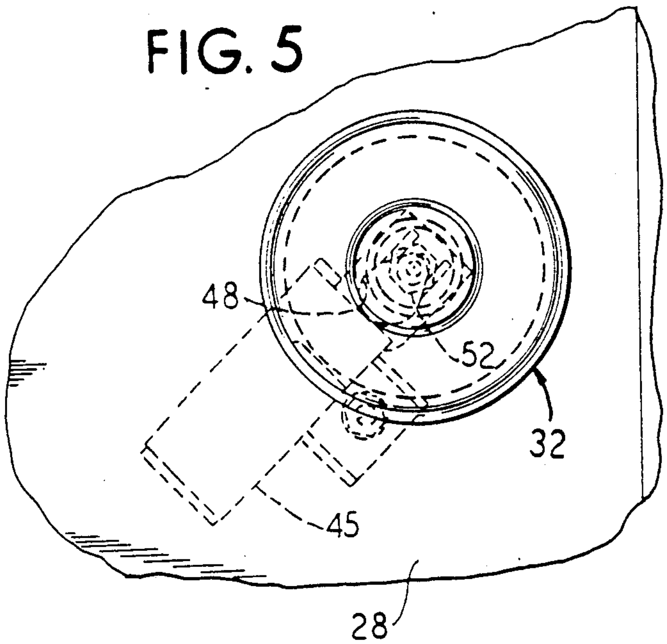
FIG. 5 is a partial plan view of the dishwasher tub bottom wall in the area of the float.
Figure 6:
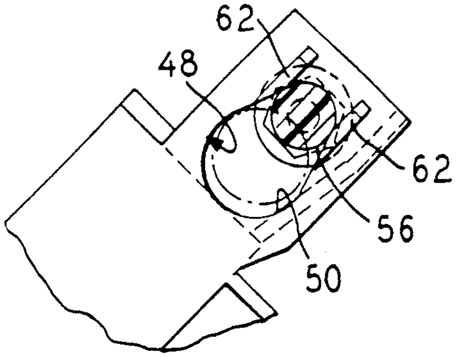
FIG. 6 is a partial plan view of the housing arm and keyway with the float stem in section.

FIG. 1 shows a dishwasher 10 having a cabinet 12 and an openable door 14. The interior of the door carries a rinse additive dispenser 16, a detergent dispenser 18 and a removable silverware basket 20. A wash chamber 22 of the cabinet 12 houses dish supporting racks 24 and a rotating spray arm 26. Adjacent a floor 28 of the wash chamber 22 is a raised area 30 which houses a pump assembly (not shown) which directs wash liquid into the spray arm 26. A float 32 is provided on the floor 28 to prevent an overfill of the wash tub.

In a preferred embodiment of the invention shown in detail in FIGS. 2-8, a passage 34 formed by a standpipe 36 extends through the tub bottom wall or floor 28, the passage 34 including an open top 38 and bottom 40 end. The float 32 comprises a float body **32*a* and a float stem 32*b*. The float stem is attached at a top end 32*c* to the float body. The float stem is elongated along an axis 32*d* and extends into the passage 34 and below the tub floor 28. The float body 32*a* has an interior diameter D1 which is greater than a diameter D2 of the passage 34** such that the float body is limited in its downward travel by the standpipe 36.

Positioned below the passage 34 is a housing 42 containing a float switch 44 responsive to the vertical position of the float 32 for preventing overfill of the dishwasher tub. The housing 42 comprises a retaining means in that it includes a body 45 with an extending arm 46 in which there is formed a first detent 48 in the shape of a keyway having a widened portion 50 for permitting passage therethrough of a second detent 52 in the shape of an enlarged diameter retaining ring carried on the stem **32*b* of the float 32, and a narrowed portion 56 for preventing passage of the retaining ring 52 therethrough. An actuating arm 58 of the switch 44 extends from the housing 42 to a position underneath the keyway 48 which is actuatable by float stem 32*b***.

The housing 42 is oriented relative to the standpipe 36 such that the narrowed portion 56 of the keyway 48 is aligned coaxially with a central axis 60 of the standpipe passage 34 and axis **32*d* of the float stem 32*b***.

The invention provides means associated with the restraining means and the float for causing captured engagement of the stem with the restraining means upon a sufficient downward movement of the stem relative to the restraining means and for preventing disengagement of the stem from the restraining means upon a predetermined amount of upward movement of the stem.

In the preferred embodiment of the invention illustrated in the FIGS., a pair of upstanding walls 62 are provided on a top wall 63 of the housing arm 46. The upstanding walls 62 are located on each side of the narrowed portion 56 of the keyway 48. The upstanding walls 62 are separated a distance D3 less than a diameter D4 of the retaining ring 52, each of which includes a guiding wall surface or edge 64 that is relieved or angled and an obtuse angle relative to the insertion direction of the float stem **32*b* along the passage axis 60. The guiding wall surface 64 engages (FIG. 2) and biases (FIG. 3) the retaining ring 52 toward the widened portion 50 of the keyway when the float stem 32*b* is inserted into the standpipe 36. The float stem 32*b* is sufficiently flexible so that the retaining ring 52 remains in position on the float stem 32*b* when the retaining ring 52 is deflected or biased by the upstanding walls 62**.

When inserted, the float stem portion having the retaining ring 52 is received and passes through the widened portion 50 of the keyway 48, whereupon the float stem **32*b* returns to a straightened configuration (FIG. 4) coaxial with the passage axis 60, projecting through the narrowed portion 56 of the keyway 48. The retaining ring 52 is then automatically captured below the arm 46 of the housing 42 preventing unintentional removal of the float 32** from the dishwasher.

Figure 4:
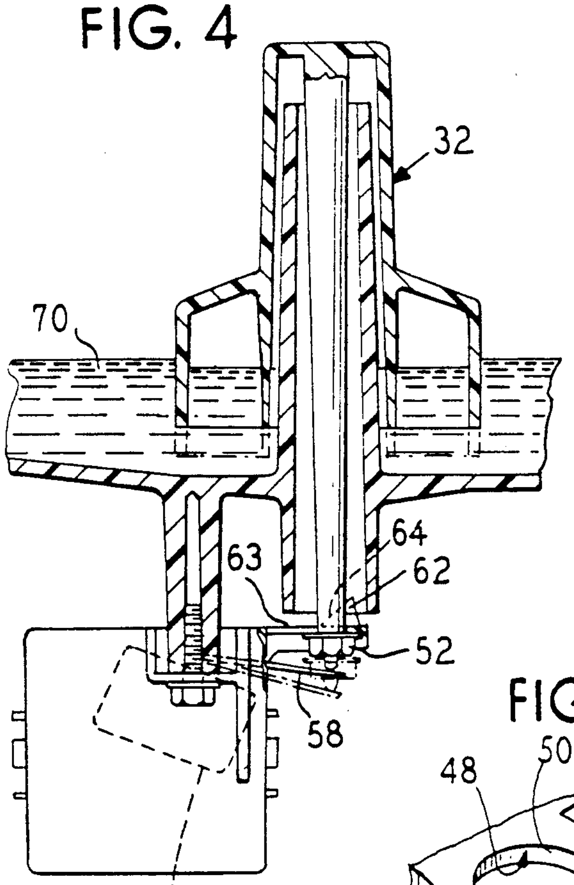
FIG. 4 is a side sectional view of the float stem fully inserted into the standpipe.
Figure 7:
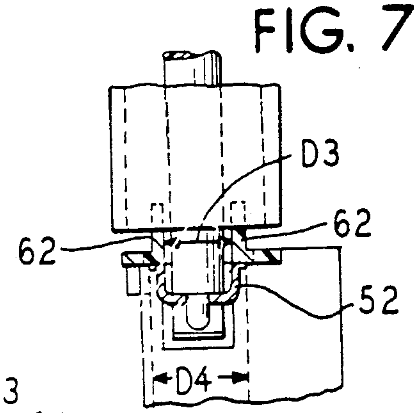
FIG. 7 is a partial side sectional view of the float stem captured on the switch housing arm.
Figure 8:
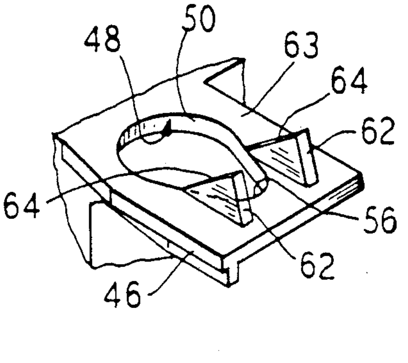
FIG. 8 is a partial perspective view of the switch housing arm.

As seen in FIG. 4, the float 32 is then capable of moving vertically a small degree. Usually, the weight of the float will cause the float to press downwardly on the switch actuator 58. When a water level 70 within the tub reaches a predetermined height, the float 32 will raise sufficiently so as to allow the switch actuator arm 58 to move upwardly to change the state of switch 44 causing a termination of further inleting of water.

Although a particular embodiment of a restraining means for the float is illustrated, being a retaining ring captured on the stem **32*b* of the float and captured beneath an arm 46 of the switch housing 42**, the present invention contemplates all other restraining means located beneath the tub bottom wall for restraining upward movement of the float and which restraining means, along with the float include means for causing automatic captured engagement of the stem with the restraining means upon a sufficient downward movement of the stem relative to the restraining means and preventing disengagement of the stem from the restraining means upon a predetermined amount of relative upward movement of the stem. For example, various types and shapes of detents other than a keyway in an arm and a ring passable through a portion of the keyway and captured by another portion of the keyway, may be employed, such as various types of resilient fingers carried either on the float stem or on some member fixed relative to the tub bottom wall engageable with a specially configured fixed member or float stem.

In accordance with the present invention, the float may be installed into the wash tub in a single step, eliminating the previously required step of attaching the retainer to the float stem in a separate operation following insertion of the float stem through the bottom wall of the tub. By providing the capturing means of the keyway detent in the housing containing the float switch, the overall cost of the apparatus is reduced in that the number of parts is held to a minimum and the cost of assembly is correspondingly reduced.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The embodiments of the invention in which an exclusive property or privilege is claimed are defined as follows:

1. In a dishwasher having a tub with a bottom wall, means for introducing water into said tub and switch means for controlling said means for introducing water into said tub, an improved apparatus for protecting said tub from being overfilled by water, said improvement comprising:

a passage extending through said tub bottom wall, said passage including an open top and bottom end, a float positioned in said passage including a float body for responding to water level within said tub and a retainer means adjacent a stem secured to said float body, said stem having a retainer means adjacent a bottom end terminating below said tub bottom wall, said stem being operatively engageable with said switch means, restraining means located beneath said tub bottom wall for restraining upward movement of said float, means associated with said restraining means and said float retainer means for causing automatic captured engagement of said retainer means with said restraining means upon a sufficient downward insertion movement of said stem relative to said restraining means and thereafter preventing disengagement of said stem from said restraining means by said retainer means upon a predetermined amount of relative upward movement of said stem during normal operation of said float in relationship to said switch means.

2. A dishwasher according to claim 1, wherein said passage is defined by a standpipe formed in said bottom wall of said tub.

3. A dishwasher according to claim 2, wherein said float body has an interior diameter greater than a diameter of said standpipe.

4. A dishwasher according to claim 1, wherein said restraining means comprises means fixed relative to said dishwasher tub secured below said tub bottom wall for effecting captured engagement with said stem retainer means.

5. A dishwasher according to claim 4, wherein said retainer means on said float stem comprises a detent shape engageable with said restraining means fixed relative to said dishwasher tub.

6. A dishwasher according to claim 5, wherein said detent shape comprises an enlarged diameter ring positioned at a lower end of said float stem.

7. A dishwasher according to claim 4, wherein said restraining means fixed relative to said dishwasher tub comprises a detent shape configured to capture said retainer means on said float stem.

8. A dishwasher according to claim 7, wherein said capturing detent comprises a keyway having an enlarged opening area for receiving said retainer means on said float stem and a reduced diameter area for preventing disengagement of said retainer means on said float stem from said keyway, said restraining means further comprising means for directing said retainer means on said float stem toward said enlarged diameter portion of said keyway during insertion of said float stem relative to said restraining means and means for moving said retainer means on said float stem toward said reduced diameter area of said keyway following passage of said retainer means on said float stem through said keyway.

9. A dishwasher according to claim 8, wherein said means for directing said retainer means on said float stem toward said large diameter of said keyway comprises a wall surface obtusely angled relative to a direction of said insertion, said wall surfaces angled toward said enlarged diameter opening of said keyway.

10. A dishwasher according to claim 8, wherein said means for moving said float stem toward said small diameter portion of said keyway comprise said float stem being resilient and said small diameter portion being positioned coaxially with said passageway receiving said float stem.

11. In a dishwasher having a tub means for introducing water into said tub and switch means for controlling said means for introducing water into said tub, an improved apparatus for protecting said tub from being overfilled by water, said improvement comprising:

a standpipe extending into said tub from a lower wall thereof, said standpipe having a wall defining a passageway having open ends, one end being secured to said lower tub wall, a float, said float including a float body for responding to water height within said tub, and a float stem extending from said float body through said standpipe, said float stem having an upper end and a lower end, said upper end being secured to said float body and said lower end terminating at a point beyond said tub wall and said standpipe, said float stem lower end including a radially extending retainer, securing means located beneath said lower tub wall for securing said float stem to said dishwasher, said securing means including a keyway through which said float stem extends, said keyway including a widened portion permitting passage of said retainer therethrough and a narrowed portion restricting passage of said retainer therethrough, said narrowed portion of said keyway being aligned coaxially with said standpipe, a wall surface about said narrowed portion of said keyway angled toward said widened portion of said keyway for deflecting said float stem and directing said retainer through said widened portion when said float stem is inserted into said standpipe, whereby upward movement of said float stem is limited by said retainer engaging said securing means during normal operation of said float in relationship to said switch means.

12. A dishwasher as claimed in claim 11, wherein said switching means further includes housing means at least partially enclosing said switching means, and said guide means for said float stem being formed integral with said housing means.

13. A dishwasher as claimed in claim 11, wherein said wall surface comprises a top surface of a pair of spaced upstanding walls extending toward said standpipe from beneath said lower tub wall, said upstanding walls being spaced at a distance less than a diameter of said retainer.

14. A dishwasher as claimed in claim 13, wherein said pair of spaced upstanding walls are integral to said securing means.

15. In a dishwasher having a tub with a bottom wall, means for introducing water into said tub and switch means for controlling said means for introducing water into said tub, an improved apparatus for protecting said tub from being overfilled by water, said improvement comprising:

a passage extending through said tub bottom wall, said passage including an open top and bottom end, a float positioned in said passage including a float body for responding to water level within said tub and a stem secured to said float body, said stem having a bottom end terminating below said tub bottom wall operatively engageable with said switch means, a first detent fixedly positioned below said tub bottom wall, a second detent carried on said float stem, means associated with said detents for causing automatic captured interengagement between said detents after insertion of said float stem through said open bottom end of said passage and during normal operation of said float in relationship to said switch means.

16. A dishwasher according to claim 15, wherein said second detent comprises an enlarged diameter ring positioned near a bottom end of said float stem.

17. A dishwasher according to claim 16, wherein said first detent comprises a keyway with a narrow opening, smaller than said enlarged diameter ring positioned coaxially below said passage, and a wider opening, larger than said enlarged diameter ring laterally spaced from an axis of said passage, and said means comprises a wall surface obtusely angled relative to an insertion direction of said float stem along said axis, said wall surface engaging and guiding said ring toward said wider opening upon insertion of said float stem, said float stem being flexible and resilient so as to return to a coaxial position, relative to said passage, after said ring has passed through said opening.

* * * * *